Patented May 13, 1947

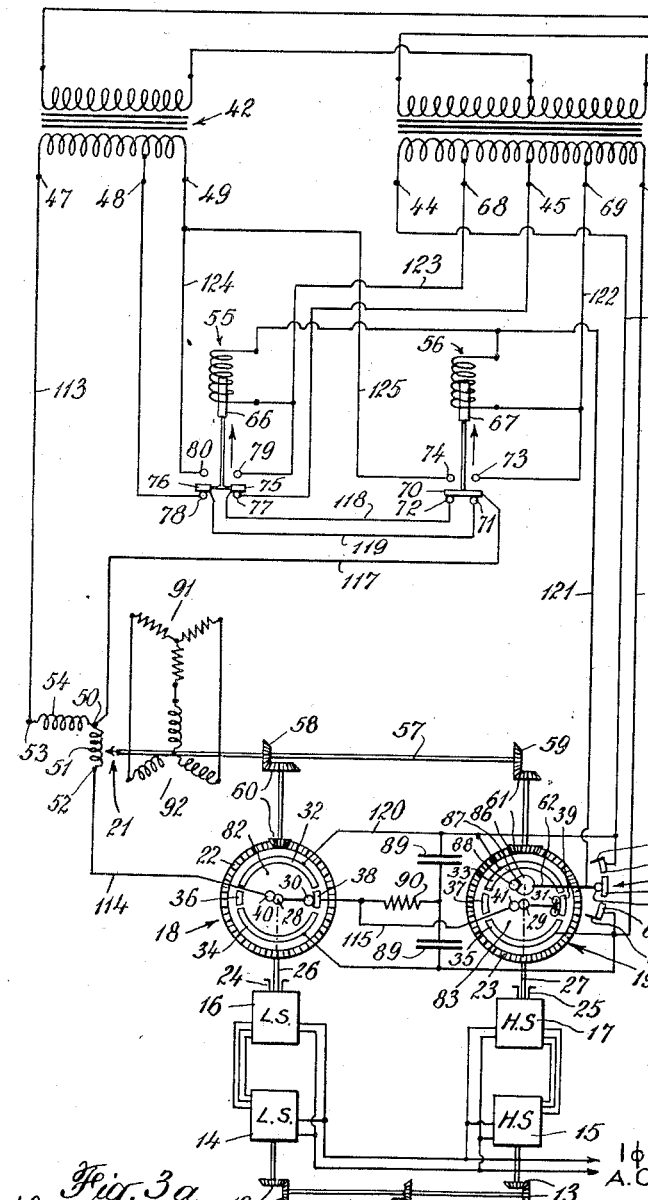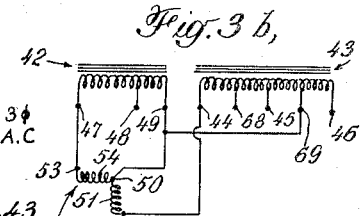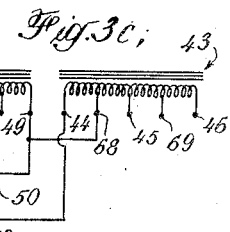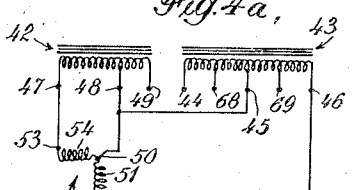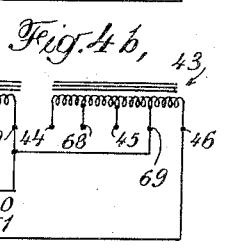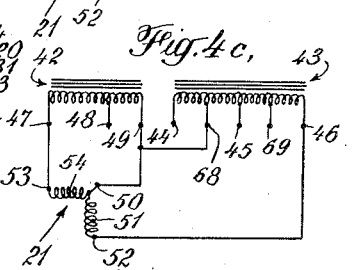

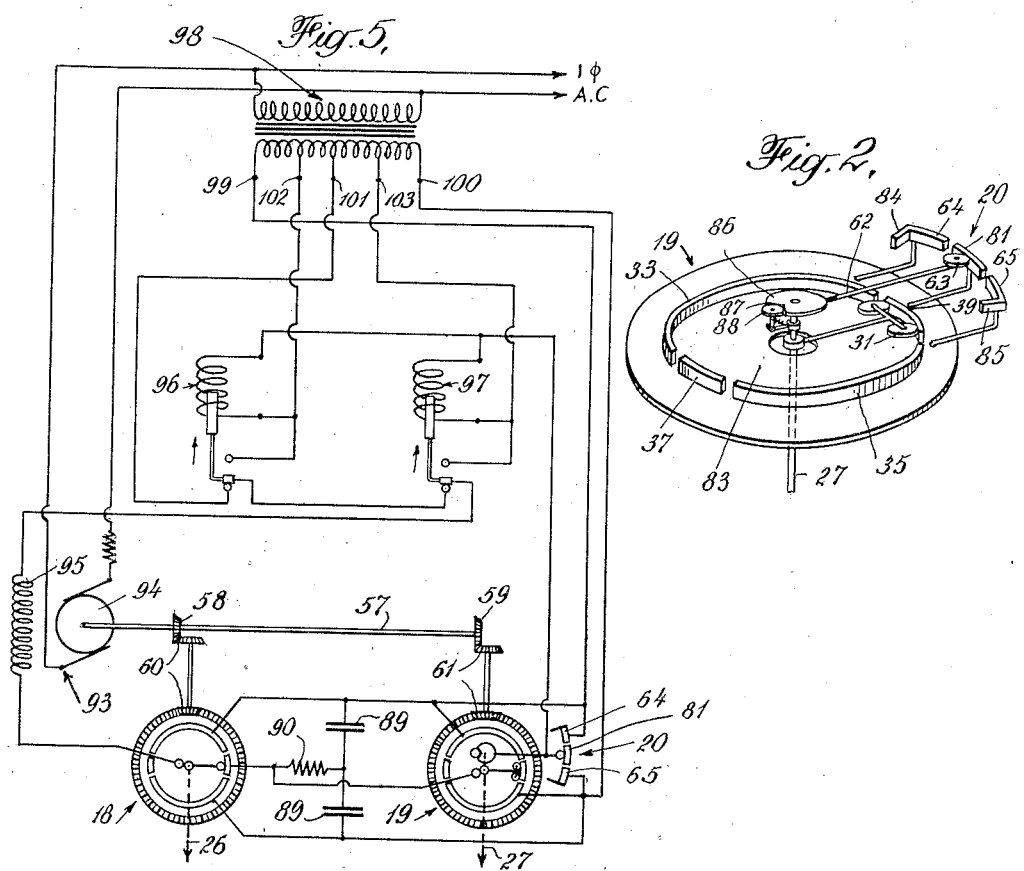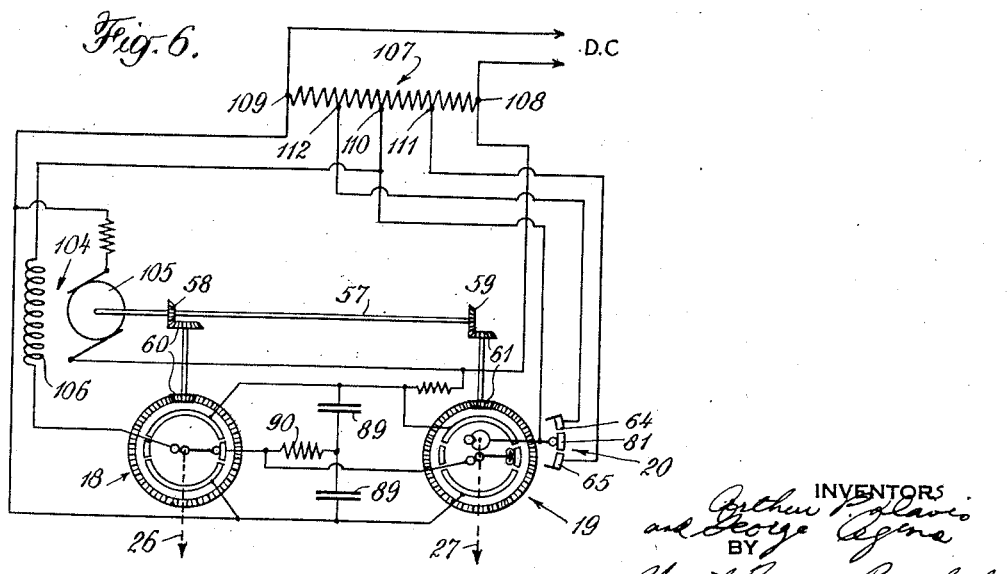

2,420,523

UNITED STATES PATENT OFFICE 2,420,523

DAMPING DEVICE FOR REMOTE CONTROL APPARATUS

Arthur P. Davis, New York, and George Agins, Brooklyn, N. Y., assignors to Arma Corporation, a corporation of New York Application June 10, 1938, Serial No. 212,960

2 Claims. (Cl. 172—239)

This invention relates to control systems of the type in which a local or remote controlled element may be instantaneously driven at a rate of speed and through a distance or angle corresponding to the rate and extent of movement of a controlling element and has particular reference to damping means therefor.

In accordance with this invention, a position control system is provided with means for damping the movements of a controlled motor, which is jointly controlled by the follow-up heads of the high speed and low speed receivers of a self-synchronous transmission system, and by the damping means which is mounted on the high speed receiver follow-up head.

In the control systems, a deviation between the controlling and controlled elements causes the engagement of the operating contacts of the follow-up heads for normal operation of the pilot motor, and the direction of the pilot motor torque is determined by the direction of the relative angular deviation between the controlling and controlled elements, so that whether the controlled element lags or leads the controlling element, the pilot motor is always energized for rotation in the direction which tends to eliminate the said deviation.

The preferred form of the damping switch operates in response to the direction of the relative angular motion between the controlling and controlled elements, to change the magnitude of the normal operation voltages which are applied to the pilot motor primary windings, so that the resulting change in pilot motor torque will be in the direction to bring the controlled element into positional agreement with the controlling element in a very rapid, smooth and efficient manner.

For a more complete understanding of the invention, reference may be had to the accompanying drawings, in which:

Figure 1 is a schematic diagram of the control system of this invention embodying the new damping means and illustrates a polyphase alternating current service.

Figure 2 illustrates in enlarged perspective one arrangement of a damping switch constructed in accordance with this invention;

Figure 3a is a fragmentary view of the transformer connections in Figure 1 illustrating the connections for normal operation of the system when the follow-up heads are rotating in a counterclockwise direction.

Figure 3b is a fragmentary view of the changed transformer connections of Figure 3a which result from the operation of the damping switch in one direction;

Figure 3c is a similar view illustrating the changed connections of Figure 3a which result from the operation of the damping switch in the opposite direction;

Figure 4a is a fragmentary view of the transformer connections of Figure 1 for normal operation of the system when the follow-up heads are rotating in a clockwise direction as viewed in Figure 1;

Figure 4b is a similar view illustrating the connections of Figure 4a which result from the operation of the damping switch in one direction;

Figure 4c illustrates the changed connections of Figure 4a which result from the operation of the damping switch in the opposite direction;

Figure 5 is a schematic diagram of the control system of this invention as adapted for the use of a single phase commutator type alternating current pilot motor; and Figure 6 is a schematic diagram of the control system of this invention as adapted for use with a direct current pilot motor.

Referring to Figure 1 of the drawings, the controlling element, located at a local or remote station, may be a handwheel 10, or other controlling device, which through gearing 11, 12 and 13, actuates the rotors of respective low and high speed self-synchronous, rotary induction transmitters 14 and 15 of conventional form. Located at the local or remote station of the controlled element, are respective low and high speed self-synchronous rotary induction receivers 16 and 17, also of conventional form, which are electrically connected respectively to the corresponding low and high speed transmitters 14 and 15, so that the rotors of the receivers are in positional agreement with the rotors of the corresponding transmitters at all times. The low speed or coarse control receiver 16 is equipped with a follow-up head 18, and the high speed or fine control receiver 17 is equipped with a follow-up head 19 and a novel damping switch 20.

The two follow-up heads 18 and 19 include respective gears 22 and 23, which are coaxially journaled on sleeves 24 and 25. The sleeves 24 and 25 are secured to the frames of the respective receivers 16 and 17, and the shaft extensions 26 and 27 of the respective receiver rotors are free to turn within the respective sleeves 24 and 25. The contact rings 28 and 29, and trolley arrangements 30 and 31, are secured to and insulated from the corresponding rotor shaft extensions 26 and 27.

Two long contact segments 32, 34, and two short contact segments 36, 38, are mounted on insulated disc 82 which is secured to gear 22, and two long contact segments 33, 35, and two short contact segments 37, 39 are mounted on insulated disc 83 which is secured to gear 23. In each follow-up head, the two long segments and the two short segments are respectively diametrically opposite each other, and the two short segments are positioned in the spaces between the ends of the long segments in such fashion that an insulating gap is provided between all of the adjacent segments. Contact rollers or brushes 40 and 41 are held by light spring pressure against the corresponding contact rings 28 and 29 at all times.

The single trolley contactor 30 of low speed head 18 is adapted to engage contact segments 32, 34, 36, 38. Similarly, the double trolley contactor 31 of high speed head 19 is adapted to engage contact segments 33, 35, 37, 39. The trolley contactors 30 and 31 are held against the contact segments by means of light spring pressure. The contact span of the high speed double trolley contactor 31 is such that when it is centrally positioned on one of the short contact segments 37 or 39, the angular distance between either trolley and the nearer adjacent long contact segment is very short. The external electrical connections to the contact segments of the follow-up heads are made by means of conventional brushes and contact rings, not shown.

A pilot motor 21 for actuating or controlling the controlled element is provided with an extended shaft 57, which for purposes of this description may be considered the controlled element. Shaft 57 is provided with the gears 58 and 59, and gear 58 serves to rotate gear 22 of low speed follow-up head 18 through the gearing 60, while gear 59 serves to rotate gear 23 of high speed follow-up head 19 through gearing 61. Pilot motor 21 is of the induction type, having a two phase primary winding and a three phase wound rotor secondary winding 92, to which a Y-grouping of resistors 91 is connected. The primary winding includes the two windings 51 and 54 which have a common connection 50 and the extremities 52 and 53.

The gear ratios between the controlling element 10 and the transmitters 14 and 15, and between the pilot motor 21 and the follow-up heads 18 and 19, and the electrical connections of the system, are such that a displacement of shaft extension 27 of high speed receiver 17 will displace the attached double trolley 31 from short contact segment 39 to long contact segment 33 or 35 of high speed follow-up head 19. This will energize the pilot motor 21 for the rotation of gear 23 and its attached contact segments in the same direction and through the same angle as the displacement of shaft extension 27 of high speed receiver 17, so that the short contact segment 39 will again centrally engage the double trolley 31, which returns the system to its synchronized condition with the pilot motor rotor shaft or controlled element 57 in positional agreement with the controlling element 10.

Low speed follow-up head 18 operates in a similar manner to restore the system to its synchronized condition. Condensers 89 and resistor 90 are electrically connected to the contacts of the follow-up heads 18 and 19 to suppress sparking at the contacts during the operation of the system.

Power for the pilot motor 21 is supplied from the transformers 42 and 43, whose primaries are connected in T relation to each other and to a three-phase system, to provide a three-phase to two-phase transformation by means of the well known Scott connection. Thus, one voltage is supplied at the terminals 47, 49 of transformer 42, and a second voltage, displaced by 90° in phase with respect to the first is provided at the terminals 44, 46 of transformer 43. The secondary winding of transformer 42 is provided with a voltage tap 48, and the secondary winding of transformer 43 is provided with a midtap 45 and two intermediate voltage taps 68, 69, in order that voltages of different magnitude may be obtained on each phase of the two-phase system.

The connections between the motor 21 and the two-phase voltage supply may be changed by means of the relays 55 and 56 which are provided with the armatures 66 and 67, respectively. The armature 66 of relay 55 carries two contacts 75 and 76, which, in the normal deenergized position, engage contacts 77 and 78, respectively, and which, in the energized position, engage contacts 79 and 80, respectively. Armature 67 of relay 56 carries a contact 70, which, in the normal deenergized position, engages contacts 71 and 72, and which, in the energized position engages contacts 73 and 74.

The relays 55 and 56 are selectively energized by a damping switch 20 consisting essentially of contact arm 62, which at one end is fastened to a disc 86 journaled to shaft extension 27 of high speed receiver 17, and at the other end carries a contact trolley 63. The contact trolley 63 is adapted to engage contact segments 64, 65 and 81 which are rigidly supported on insulated disc 83 of high speed follow-up head 19, as is illustrated in detail in Fig. 2. Contact segment 64 is electrically connected to long contact segment 33, and is provided with a stop 84 to limit the movement of trolley 63. Contact segment 65 is electrically connected to long contact segment 35, and is provided with a stop 85 for trolley 63. Contact segment 81 is positioned between and in spaced relation to the contact segments 64 and 65, so as to be insulated from them. Contact arm 62 is electrically insulated from shaft extension 27, and is electrically connected to the coils of respective relays 55 and 56.

Disc 86 is provided with an edge notch 87, which is adapted to receive a spring mounted roller 88, which is secured to shaft extension 27, when double trolley 31 is centrally positioned, or nearing its central position on short contact segment 39 of high speed follow-up head 19. The light spring pressure on the roller 88, whether the roller 88 is at the bottom of the notch 87 or on the periphery of the disc 86, will cause contact trolley 63 of damping switch 20, within its limits of travel between stops 84 and 85, to move exactly with shaft extension 27 of high speed receiver 17.

Thus, when the relative movement between shaft extension 27 and disc 83 is sufficient to cause the engagement of contact trolley 63 with one of the stops, either 84 or 85, and the relative movement persists in the same direction, the roller 88, if it is in the notch 87, will move out of the notch and on to the periphery of disc 86. If the roller 88 is on the periphery of the disc 86 when contact trolley 63 engages one of the stops, and the relative movement continues in the same direction, the roller 88 will roll on the periphery of the disc until it reaches the sloping sides of the detent 87, when the roller will tend to roll to the bottom of the notch. Accordingly, when the controlling element 10 is at rest with the pilot motor 21 or controlled element 57 in positional agreement with it, the control system of this invention will be in its normal deenergized condition, with double trolley 31 of follow-up head 19 centrally positioned on short contact segment 39, and contact trolley 63 of damping switch 20 centrally positioned on contact segment 81.

It will be evident that the rotor of high speed receiver 17 will at all times be free to rotate and assume the position corresponding to the position of the rotor of high speed transmitter 15, and will not be blocked in any manner by the engagement of damping switch trolley 63 with stops 84 or 85.

In the operation of the control system illustrated in Figure 1 of the drawings, and assuming that it is in its normal deenergized condition with the pilot motor shaft 57 or controlled element in positional agreement with the controlling element 10, rotation of the controlling element 10 will be transmitted through gearing 11, 12 and 13 to the rotors of the low and high speed transmitters 14 and 15. The resultant rotation of these rotors in a corresponding direction and angle will result in an equal and substantially simultaneous movement of the rotors of respective low and high speed receivers 16 and 17. The double trolley 31 of high speed follow-up head 19 will accordingly be displaced to engage segment 33 or 35, depending upon the direction of rotation of the controlling element 10, and thereby energize primary winding 51 of pilot motor 21.

Assuming that the shaft extension 27 is rotating in the counter-clockwise direction as viewed in Figure 1, normal voltage is supplied to the motor. Thus the extremity 53 of pilot motor winding 54 is connected to end tap 47 on transformer 42 through a wire 113, and the extremity 52 of pilot motor winding 51 is connected through a wire 114, contact roller 40, contact ring 28, trolley arrangement 30, short contact segment 38, wire 115, contact roller 41, contact ring 29, trolley arrangement 31, long contact segment 33, a wire 120 and wire 116 to end tap 44 on transformer 43. Similarly, the common point 50 of windings 54 and 51 is connected through a wire 117, armature contact 70, contact 72, wire 118, armature contact 75 on relay 55, contact 77, to the midtap 45 on transformer 43. The common point 50 is also connected through the wire 117, armature contact 70 on relay 56, contact 71, wire 119, armature contact 76 on relay 55 and contact 78 to the voltage tap 48 on transformer 42, so that normal voltage is impressed on both primary windings 54 and 51 of the two-phase induction motor 21, causing it to rotate in the counter-clockwise direction to eliminate the deviation between the controlled element 19 and the controlling element 57. These connections are shown in simplified form in Figure 3a.

If, due to failure of the electric supply to the pilot motor 21 or other causes, the pilot motor 21 is unable to follow rapid movements of the controlling element 10, and they become displaced more than a permissible amount, trolley 30 of low speed follow-up head 18 will have been advanced to a point where it no longer makes contact with short segment 38 and thereby disconnects double trolley 31 of high speed follow-up head 19 from the circuit, so that the high speed follow-up head 19 will be deprived of control, and control will be assumed by low speed follow-up head 18.

If the pilot motor does not accelerate rapidly enough to follow the movement of double trolley 31, the relative movement between shaft extension 27 and disc 83 will cause trolley 63 of damping switch 20 to engage contact 64. This closes a circuit from end tap 44 on transformer 43, through wire 116, contact segment 64 on damping switch 20, damping switch trolley 63, wire 121, relay 56, and wire 122 to intermediate tap 69 on transformer 43. A circuit is also completed from wire 121 through relay 55, and wire 123 to intermediate tap 68 on transformer 43.

The voltage between the taps 44 and 68 of transformer 43 is not sufficient to energize relay 55, so that contacts 77 and 78 are still engaged by armature contacts 75 and 76 respectively. The voltage between taps 44 and 69, however, is sufficient to energize the relay 56 so that its armature 67 rises and contacts 71 and 72 are disengaged by armature contact 70 which then engages contacts 73 and 74. This operation changes the connections between the common point 50 of primary windings 51 and 54 of induction motor 21, and the secondary winding taps of transformers 42 and 43. Thus, the common point 50 is now connected through wire 117, armature contact 70 on relay 56, contact 73, wire 122 to tap 69 on transformer 43.

The common point 50 is also connected through wire 117, armature contact 70 on relay 56, contact 74, wire 125 to tap 49 on transformer 42. These connections are shown in simplified form in Figure 3b from which it is apparent that the maximum phase voltages are applied to the primary windings 54 and 51.

Since the torque produced by the pilot motor 21 is proportional to the square of the voltage applied to its primary windings, it will now accelerate rapidly until the speed of gear 23 in follow-up head 19 becomes slightly higher than the speed of shaft extension 27. When this occurs, contact 64 will disengage trolley 63 of damping switch 20 and central segment 81 will engage the trolley 63, so that the damping switch 20 will have returned to its inoperative condition. This will deenergize the relay 56 and thereby restore the connection of common point 50 of the pilot motor primary windings to tap 48 of transformer 42 and to tap 45 of transformer 43, which is the normal operating condition outlined above. The damping switch 20, therefore, provides an additional step of acceleration for the pilot motor when it lags behind the controlling element more than a permissible amount.

If the controlling element then is brought suddenly to zero speed, the pilot motor 21, due to inertia of its rotating parts, will drive contact 65 into engagement with trolley 63 of damping switch 20. This will complete a circuit from end tap 46 of transformer 43 through wire 126, damping switch contact 65, trolley 63, wire 121, relay 56 and wire 122 to tap 69 on transformer 43. A circuit is also closed from wire 121 through relay 55 and a wire 123 to tap 68 on transformer 43.

The voltage between taps 46 and 69 on transformer 43 is not sufficient to energize relay 56 so that armature contact 70 remains in engagement with contacts 71 and 72. The voltage across taps 46 and 68 of transformer 43, however, is sufficient to energize the relay 55, so that its armature 66 disengages armature contacts 75 and 76 from contacts 77 and 78, respectively, and engages contacts 75 and 76 with 79 and 80, respectively.

With this setting of the relays 55 and 56, the common point 50 of the windings 51 and 54 is again changed to a different voltage value. Thus, the common point is connected through wire 117, armature contact 70 on relay 56, contact 72, wire 118, armature contact 75 on relay 55, contact 79 and wire 123 to tap 68 on transformer 43. The common point 50 is also connected through wire 117, armature contact 70 on relay 56, contact 71, wire 119, armature contact 76 on relay 55, contact 80 and wire 124 to tap 49 on transformer 42. The resulting connections are illustrated in the simplified diagram of Figure 3c and this arrangement will reduce the voltage which is applied to the primary winding 51 of the pilot motor 21.

Inasmuch as the torque of the pilot motor is determined by the smaller of the two voltages which are applied to the pilot motor 21 primary windings, the torque will thereby be reduced from its normal operating value and the pilot motor 21 therefore will decelerate. The pilot motor will then drive long contact segment 33 out of engagement with double contact trolley 31 of follow-up head 19 and, when short contact segment 39 is centrally positioned under double trolley 31, the contact trolley 63 of damping switch 20 will have returned to its inoperative position on central segment 81, so that the control system will be in its normal deenergized condition with the pilot motor 21 and controlled element 57 at rest in positional agreement with the controlling element 10.

If, however, due to the inertia of the rotating parts, the pilot motor has not decelerated to zero speed when short contact segment 39 is centrally positioned under double trolley 31, the pilot motor primary winding 51 will be disconnected from transformer 43 and then the damping switch contact segment 65 will engage the trolley 63 so that the relay 55 will operate. The resulting connections are as illustrated in the simplified diagram of Figure 3c, but with the connection to tap 44 of transformer 43 broken.

Upon continued rotation of the pilot motor 21, long contact segment 35 will engage double trolley 31 of follow-up head 19, thus closing a circuit from tap 46 of transformer 43 through a wire 126, long contact segment 35, double trolley 31, contact ring 29, contact roller 41, wire 115, short contact segment 38, single trolley 30, contact ring 28, contact roller 40 and a wire 114 to extremity 52 of winding 51. The phase of the voltage now applied to pilot motor primary winding 51 will be reversed, and the voltage increased, and greater than normal operating torque will be produced in the opposite direction by the pilot motor 21 to decelerate it quickly to zero speed and then accelerate it in the opposite direction. The resulting connections are shown in the simplified diagram of Figure 4c.

Upon the resulting reversal in the direction of rotation of the pilot motor 21, contact 65 will disengage trolley 63 of damping switch 20, and central segment 81 will momentarily engage the trolley 63, thereby deenergizing relay 55 so that the movable contacts of the relay will return to their inoperative positions, which reduces the voltages applied to the pilot motor primary windings to their normal operating values for normal operating torque, and these resulting connections are illustrated in the simplified diagram of Figure 4a.

After the momentary engagement of central segment 81 with trolley 63, the damping switch contact 64 will then engage the trolley 63, so that relay 56 will be energized. Relay 56 will then transfer the connections between common point 50 of the pilot motor primary windings and the transformers, i. e., from tap 45 to tap 69 of transformer 43, and from tap 48 to tap 49 of transformer 42 as described above. With the resulting connections, which are illustrated in the simplified diagram of Figure 4b, a reduced voltage will be applied to winding 51 of the pilot motor, and the resulting reduced torque produced in the pilot motor will cause it to drive gear 23 smoothly into synchronism with shaft extension 27 of high speed receiver 17.

When synchronism is obtained, double trolley 31 will be centrally positioned on short contact segment 39 follow-up head 19, and roller 88 will be at the bottom of notch 87 in disc 86, so that the operating contacts of damping switch 20 will be disengaged, and trolley 63 will be in its inoperative position on central segment 81. The pilot motor 21, therefore, will be in its inoperative condition and at standstill, and the pilot motor rotor shaft or controlled element 57 will be in positional agreement with the controlling element 10.

In the arrangement of Figure 5 wherein the control system of this invention is shown adapted for use with a single phase, commutator type alternating current pilot motor 93, the pilot motor armature 94 is electrically connected to the single phase supply, and the field winding 95 is energized by the secondary winding of supply transformer 98. Follow-up heads 18 and 19 control the selection of either end tap 99 or 100 of transformer 98 secondary winding, and damping switch 20 changes the electrical connection of pilot motor field winding 95 from center tap 101 to either tap 102 or 103 of transformer 98 secondary winding, by operating either relay 96 or 97. Hence, the voltage which is applied to the pilot motor field winding 95 will be increased or decreased from the normal operating value by the operation of damping switch 20, and the resulting increase or decrease in pilot motor 93 torque will quickly and smoothly drive the controlled element 57 into positional agreement with the controlling element 10, not shown in Fig. 5 but similar to element 10 in Fig. 1. With a constant voltage applied to the armature 94, the torque produced by the pilot motor 93 is proportional to the voltage applied to the field winding 95.

In the arrangement of Figure 6 wherein the control system of this invention is shown adapted for use with a direct current pilot motor 104, the pilot motor armature 105 is electrically connected to the direct current supply, and the field winding 106 is energized from the voltage divider 107, which has its center tap 110 electrically connected to one end of field winding 106. The free running speed of the pilot motor 104 is higher than any speed required for the operation of the system, so any increase in the voltage which is applied to the field winding will increase the torque of the pilot motor, and thereby increase its acceleration.

Follow-up heads 18 and 19 control the selection of either end tap 108 or 109 of voltage divider 107, and damping switch 20 directly changes the normal operation voltages, which are applied to the pilot motor field winding 106, by short circuiting voltage divider taps 110, 111, or taps 110, 112. Hence the voltages applied to the pilot motor field winding 106 will be increased or decreased from the normal operating value by the operation of damping switch 20, and the resulting increase or decrease in pilot motor torque will drive the controlled element 57 quickly and smoothly into positional agreement with the controlling element, not shown. With a constant voltage applied to the armature 105, the torque produced by the pilot motor 104 is proportional to the voltage applied to the field winding 106.

It is to be noted that the system adaptation illustrated in Figure 6 differs from the systems illustrated in Figures 1 and 5, in that relays under the control of the damping switch are not required, and the damping switch contacts 64 and 65, instead of being electrically connected to the respective long contact segments of the follow-up heads, are electrically connected directly to the respective taps 112 and 111 of the voltage divider 107.

It will be seen that the damped control system of this invention is very simple in construction, but very effective and efficient in operation, and can be used for reproducing with shaft 57 the movements of any controlling element such as a handwheel, lever, telescope, and the like, or for adjusting a remote controlled pilot device, such as motors 21, 93 or 104, in accordance with impulses developed by photoelectric devices, thermostats, valves, floats, air or fluid flow meters and apparatus, and the like, as will be readily understood.

Although certain specific embodiments of the invention have been illustrated and described herein, the invention is not intended to be in any way limited thereby, but is capable of numerous changes in form and detail within the scope of the appended claims.

We claim:

1. A system comprising a controlling element, a controlled element governed thereby, a motor connected to said controlled element, a source of voltage for the said motor, fine control means responsive to small angular deviation between the controlled element and the controlling element for closing a circuit from said source to the motor, coarse control means responsive to relatively large deviation between the said controlled element and controlling element for closing a circuit from said source to the motor and for disconnecting the fine control means from said source, mechanism for changing the voltage supplied to said motor from said source, and means actuated by one of said means in response to relative angular movement between the said controlled and controlling elements for actuating said mechanism to change the voltage supplied to the motor to accelerate it rapidly in a direction to reduce the said deviation.

2. A system comprising a controlling element, a controlled element governed thereby, a reversible motor, a voltage supply, an input transformer for the said motor having a plurality of taps, a pair of relays each having contacts to connect the motor to certain of said taps, fine control means responsive to a predetermined small degree of positional disagreement between the controlling and controlled elements for connecting the motor to said supply to drive the motor in the direction of the controlling element, coarse control means responsive to a positional disagreement in excess of said predetermined degree between the said elements for rendering the fine control means inoperative and for connecting the motor to said supply to rotate it in the direction of the controlling element, a damping switch responsive to a differential velocity between said elements, said switch comprising a pair of spaced contacts driven by the controlled element and a movable contactor adapted to selectively engage the said contacts and connections between each contact and one of said relays, whereby said relays change the voltage applied to the said motor to accelerate it in the direction to reduce the said positional disagreement.

ARTHUR P. DAVIS.
GEORGE AGINS.

REFERENCES CITED

The following references are of record in the file of this patent:

UNITED STATES PATENTS

| Number | Name | Date |
|---|---|---|
| 1,971,703 | Carney | Aug. 28, 1934 |
| 2,103,287 | Howard | Dec. 28, 1937 |
| 1,508,796 | Kaminski | Sept. 16, 1924 |
| 1,559,525 | Murphy | Oct. 27, 1925 |
| 1,651,852 | Trevor | Dec. 6, 1927 |

FOREIGN PATENTS

| Number | Country | Date |
|---|---|---|
| 702,932 | France | Feb. 2, 1931 |